US012559681B2

(12) United States Patent
Kobayashi et al.

(10) Patent No.: US 12,559,681 B2
(45) Date of Patent: Feb. 24, 2026

(54) SOLUBILIZING AGENT AND SOLUBILIZING SOLUTION

(71) Applicant: NOF CORPORATION, Tokyo (JP)

(72) Inventors: Koh Kobayashi, Kawasaki (JP); Masaru Matsuda, Kawasaki (JP); Tomozumi Noda, Kawasaki (JP)

(73) Assignee: NOF CORPORATION, Tokyo (JP)

( * ) Notice: Subject to any disclaimer, the term of this patent is extended or adjusted under 35 U.S.C. 154(b) by 671 days.

(21) Appl. No.: 17/996,470

(22) PCT Filed: Apr. 13, 2021

(86) PCT No.: PCT/JP2021/015253
§ 371 (c)(1),
(2) Date: Oct. 18, 2022

(87) PCT Pub. No.: WO2021/215293
PCT Pub. Date: Oct. 28, 2021

(65) Prior Publication Data

US 2023/0250341 A1 Aug. 10, 2023

(30) Foreign Application Priority Data

Apr. 20, 2020 (JP) ................................. 2020-074983

(51) Int. Cl.
*C09K 23/18* (2022.01)

(52) U.S. Cl.
CPC ................................... *C09K 23/18* (2022.01)

(58) Field of Classification Search
CPC ...... C09K 23/18; C09K 23/20; G01N 33/743; G01N 33/82; G01N 33/92; G01N 33/531
See application file for complete search history.

(56) References Cited

U.S. PATENT DOCUMENTS

| | | | | |
|---|---|---|---|---|
| 6,939,951 | B1 | 9/2005 | Kiefer et al. | |
| 10,620,177 | B2 * | 4/2020 | Nakashima ............ | G01N 33/15 |
| 2006/0058509 | A1 | 3/2006 | Kiefer et al. | |
| 2017/0226499 | A1 | 8/2017 | Nakashima et al. | |
| 2017/0261481 | A1 | 9/2017 | Nakashima et al. | |

FOREIGN PATENT DOCUMENTS

| | | | |
|---|---|---|---|
| JP | H05-312807 | A | 11/1993 |
| JP | H10-279918 | A | 10/1998 |
| JP | 2003-507490 | A | 2/2003 |
| JP | 2003-137816 | A | 5/2003 |
| JP | 2007-314526 | A | 12/2007 |
| JP | 2015-119687 | A | 7/2015 |
| JP | 2018-115134 | A | 7/2018 |
| WO | WO 2016/021678 | A1 | 2/2016 |
| WO | WO 2016/039319 | A1 | 3/2016 |

OTHER PUBLICATIONS

Tzocheva et al., "Solubility Limits and Phase Diagrams for Fatty Acids in Anionic (SLES) and Zwitterionic (CAPB) Micellar Surfactant Solutions," *J. Colloid Interface Sci.*, 369(1): 274-286 (2012).

Bissette et al., "Physical Autocatalysis Driven by a Bond-forming Thiol-ene Reaction," *Nat. Commun.*, 5: 4607 (2014).

Matsuno et al., "Simple Synthesis of a Library of Zwitterionic Surfactants via Michael-Type Addition of Methacrylate and Alkane Thiol Compounds," *Langmuir.*, 26(16): 13028-13032 (2010).

Matsuno et al., "Synthesis of Phosphorylcholine Type Zwitterions Surfactant by Michael Addition and Evaluation of the Solubilization Property," *Polymer Preprints*, Japan, 58(2): 4609-4610 (2009).

Japan Patent Office, Written Opinion of the International Searching Authority in International Patent Application No. PCT/JP2021/015253 (Jun. 15, 2021).

Japan Patent Office, International Search Report in International Patent Application No. PCT/JP2021/015253 (Jun. 15, 2021).

Matsuno et al., "Simple Synthesis of a Library of Phosphorylcholine Compounds via Michael Addition of MPC Monomer and Thiol Compounds," *Polymer Preprints*, Japan, 59(2): 4892 (2010).

* cited by examiner

*Primary Examiner* — Shafiqul Haq
(74) *Attorney, Agent, or Firm* — Leydig, Voit & Mayer, Ltd.

(57) ABSTRACT

The present invention provides a solubilizing agent for hardly water-soluble substances, which contains a compound represented by the formula (1):

(1)

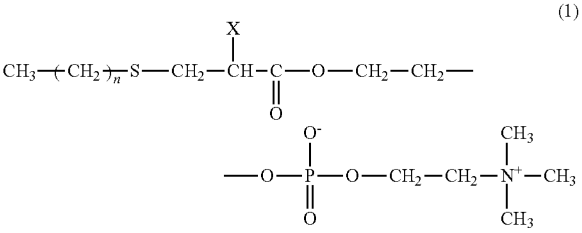

wherein the symbols in the above formula are as defined in the specification.

9 Claims, No Drawings

SOLUBILIZING AGENT AND SOLUBILIZING SOLUTION

TECHNICAL FIELD

The present invention relates to solubilizing agents for hardly water-soluble substances, and solubilizing solutions for hardly water-soluble substances. The solubilizing agents and the solubilizing solutions of the present invention can be used for dissolving, for example, a hardly water-soluble substance present in samples, such as plasma, serum, blood, and the like, in water or an aqueous solution (e.g., buffer).

BACKGROUND ART

With the aim of achieving early detection of diseases, measurement methods utilizing immune responses are widely used in the fields of clinical tests and diagnostic agents. In this context, expansion of test objects and improvement of measurement sensitivity are desired, in which the detection of hardly water-soluble substances has become a major issue.

In measurement methods that use immune responses, substances (e.g., peptide, protein, nucleic acid, antibody, antigen, etc.) contained in samples such as serum, plasma, cell extract, and urine, are detected as test targets. However, when the test target is a hardly water-soluble substance, such as lipid, liposoluble vitamin, steroid, or the like, antibodies and enzymes responsible for immune responses do not react due to the low solubility of the test target in water, or precipitation and cloudiness occur during the measurement, thus making the detection difficult.

Conventionally, surfactants are widely used to increase solubility of such hardly water-soluble substances. Surfactants are classified into anionic surfactants, cationic surfactants, amphoteric surfactants, and nonionic surfactants, and include many types. When a nonionic surfactant and an anionic surfactant are used in combination as described in Patent Literature 1, investigation of the combination is very complicated since there are many types of surfactants. In the case of diagnostic agents that utilize immune responses and enzyme reactions, moreover, a lot of labor is necessary for the selection of surfactants that can be used and investigation of the addition concentration thereof since surfactants cause denaturation of proteins, which in turn decreases the activity of antibodies and enzymes.

Patent Literatures 2 and 3 describe methods for solubilizing membrane proteins and hardly water-soluble substances by using 2-methacryloyloxyethyl phosphorylcholine polymers. However, when a 2-methacryloyloxyethyl phosphorylcholine polymer is added to a solution, the viscosity of the solution may increase depending on the concentration of the polymer, and the handling property may be deteriorated.

Non Patent Literature 1 describes synthesis of phosphorylcholine surfactants. In Non Patent Literature 1, however, a solubilization test of hardly water-soluble substances by using the phosphorylcholine surfactants was not conducted.

Citation List

Patent Literature

[PTL 1]
JP-A-5-312807
[PTL 2]
JP-A-2007-314526
[PTL 3]
JP-A-2003-137816

Non Patent Literature

[NPL 1]
Ryosuke Matsumoto, Kimiaki Takami, Kazuo Ishihara, "Simple Synthesis of a Zwitterionic Surfactants via Michael-Type Addition of Mathacrylate and Alkane Thiol Compounds", Langmuir Letter, vol. 26, No. 16, p. 13028-13032, Jul. 16, 2010

SUMMARY OF INVENTION

Technical Problem

Although it is possible to dissolve hardly water-soluble substances to some extent by the methods disclosed in the above-mentioned Patent Literatures 1 to 3, they are still not sufficient. The polymers described in Patent Literatures 2 and 3 have high molecular weights, and therefore, the viscosity of the obtained solution may increase and the handling property of the solution may be deteriorated depending on the concentration of the polymers. Accordingly, an object of the present invention is to provide a solubilizing agent capable of dissolving hardly water-soluble substances such as liposoluble vitamin, fatty acid, and the like in water or an aqueous solution (e.g., buffer).

Solution to Problem

In view of the above-mentioned object, the present inventors have conducted intensive studies and found that a compound represented by the following formula (1) (hereinafter sometimes to be abbreviated as "compound (1)") is useful as a solubilizing agent for hardly water-soluble substances such as liposoluble vitamin and the like, which resulted in the completion of the present invention.

The present invention based on the above-mentioned finding is as follows.

[1] A solubilizing agent for a hardly water-soluble substance, comprising a compound represented by the formula (1):

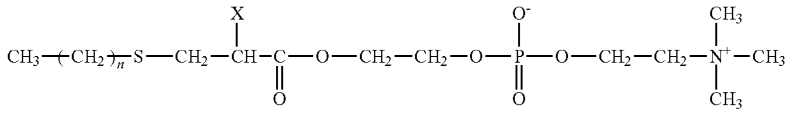

(1)

wherein X is a hydrogen atom or a methyl group, and n is an integer of 5 to 15.

[2] The solubilizing agent of the aforementioned [1], wherein the hardly water-soluble substance is at least one selected from the group consisting of a liposoluble vitamin, a steroid, and a fatty acid.

[3] A solubilizing solution for a hardly water-soluble substance, comprising the solubilizing agent of the aforementioned [1] or [2] and water.

Advantageous Effects of Invention

Compound (1) which is an active ingredient of the solubilizing agent of the present invention can improve the solubility of a hardly water-soluble substance in water. Furthermore, compound (1) has a low molecular weight and thus can suppress an increase in the viscosity of solutions containing compound (1), and can prepare a solubilizing solution for hardly water-soluble substances which exhibits good handling property.

DESCRIPTION OF EMBODIMENTS

The present invention is explained in detail in the following. In the present invention, a "hardly water-soluble substance" means a substance having water solubility that applies to any of "sparingly soluble", "slightly soluble", "very slightly soluble", "practically insoluble" as described in the Japanese Pharmacopoeia 17th Edition. The abovementioned water solubility in the Japanese Pharmacopoeia 17th Edition is determined according to the following criteria. That is, when the target is solid, it is powderized, placed in water, shaken vigorously for 30 seconds at 20±5° C. every 5 minutes, and the degree of dissolution in 30 minutes is examined. The target requiring not less than 30 mL and less than 100 ml of water to dissolve 1 g or 1 mL of the target is determined to be "sparingly soluble", the target requiring not less than 100 mL and less than 1,000 mL is determined to be "slightly soluble", the target requiring not less than 1,000 mL and less than 10,000 mL is determined to be "very slightly soluble", and the target requiring not less than 10,000 mL is determined to be "practically insoluble". In addition, the "solubilizing agent for a hardly water-soluble substance" means an agent used to dissolve a hardly water-soluble substance in water or an aqueous solution (e.g., buffer). The "solubilizing solution for a hardly water-soluble substance" means a solution used to dissolve a hardly water-soluble substance.

The solubilizing agent of the present invention can be used in immunoassays and the like that utilize enzyme reactions or antigen-antibody reactions for the measurement. Specifically, the solubilizing agent of the present invention can be used in known radioimmunoassay (RIA), enzyme immunoasssay (EIA), fluorescent immunoassay (FIA), latex nephelometry, and the like, particularly preferably enzyme immunoasssay (EIA), fluorescent immunoassay (FIA), latex nephelometry, Western blotting, and the like.

The active ingredient of the solubilizing agent of the present invention is a compound represented by the following formula (1):

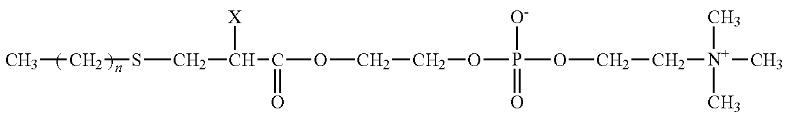

(1)

X in the formula (1) is a hydrogen atom or a methyl group, preferably a methyl group. The n in the formula (1) is an integer of 5 to 15. When n is smaller than 5, the solubilizing property of compound (1) may decrease, and when it exceeds 15, water solubility of compound (1) itself may decrease. Preferably, n is 7 to 15.

The content of compound (1) in the solubilizing agent of the present invention is preferably 50 to 100% by mass with respect to the whole solubilizing agent. The solubilizing agent of the present invention more preferably consists of compound (1).

Compound (1) can be synthesized, for example, by reacting 2-(meth)acryloyloxyethyl-2-trimethylammonioethyl phosphate with 1-alkane thiol in, for example, an alcohol solvent and using an amine catalyst such as diisopropylamine and the like at room temperature for 10 to 50 hr. As 1-alkane thiol, 1-alkane thiol having 6 to 16 carbon atoms is preferred.

The solubilizing solution of the present invention contains the solubilizing agent of the present invention (i.e., solubilizing agent containing compound (1)) and water. The solubilizing solution of the present invention optionally contains a component (hereinafter indicated as "other component") other than compound (1) and water. Examples of such other component include amino acids and salts thereof such as glycine, alanine, serine, threonine, glutamic acid, aspartic acid, glutamine, asparagine, lysine, histidine, and the like; peptides such as glycylglycine and the like; inorganic acids and salts thereof such as phosphoric acid and salts thereof, boric acid and salts thereof, hydrochloric acid and salts thereof (e.g., sodium chloride, salt of hydrochloric acid and tris hydroxymethylaminomethane), sulfates, and the like; flavins; organic acids and salts thereof such as acetic acid and salts thereof, citric acid and salts thereof, malic acid and salts thereof, maleic acid and salts thereof, gluconic acid and salts thereof, and the like; sugars such as glucose, fructose, sucrose, lactose, and the like; alcohols such as methanol, ethanol, isopropanol and the like; reagents used for measurement, and the like.

Examples of water used for the solubilizing solution of the present invention include purified water, pure water, ion exchanged water, and the like. The solubilizing solution of the present invention may be a buffer (e.g., buffer that can be used for immunoassays). Specific examples of the buffer include phosphate buffer, acetate buffer, carbonate buffer, citrate buffer, tris buffer, and HEPES buffer.

From the aspect of the solubilizing property, the content (concentration) of compound (1) in the solubilizing solution of the present invention is preferably not less than 0.01% by mass, more preferably not less than 0.025% by mass, further preferably not less than 0.05% by mass, particularly preferably not less than 0.10% by mass, with respect to the whole solubilizing solution. The upper limit of the content of compound (1) is not particularly set as long as compound (1) is dissolved in a solubilizing solution. The content of the compound in the solubilizing solution of the present invention is preferably not more than 20% by mass, more preferably not more than 10% by mass, further preferably not more than 5% by mass, particularly preferably not more than 1% by mass.

From the aspect of the maintenance of activity or prevention of denaturation of proteins such as antibody, enzyme, and the like, the content of water in the solubilizing solution of the present invention is preferably not less than 80% by mass, more preferably not less than 90% by mass, further preferably not less than 95% by mass, particularly preferably not less than 99% by mass, and preferably not more than 99.99% by mass, more preferably not more than 99.975% by mass, further preferably not more than 99.95% by mass, particularly preferably not more than 99.90% by mass, with respect to the whole solubilizing solution.

Now, the hardly water-soluble substance is described. Examples of the hardly water-soluble substance include liposoluble vitamins (vitamin D, vitamin A, vitamin E, vitamin K, and the like), steroids (cortisol (another name: hydrocortisone), hormones such as noradrenaline and the like, cholesterol, and the like), and fatty acids (lauric acid, myristic acid, linoleic acid, linolenic acid, and the like). The hardly water-soluble substance is preferably at least one selected from the group consisting of a liposoluble vitamin, a steroid, and a fatty acid, more preferably at least one selected from the group consisting of a liposoluble vitamin and a fatty acid.

A method for dissolving a hardly water-soluble substance in water by using the solubilizing agent or solubilizing solution of the present invention, is described. Examples of the aforementioned method include a method for dissolving a hardly water-soluble substance in water by mixing a hardly water-soluble substance or a mixture containing a hardly water-soluble substance (e.g., sample containing a hardly water-soluble substance), the solubilizing agent of the present invention, and water, and stirring the obtained mixture.

The method for mixing a hardly water-soluble substance, the solubilizing agent of the present invention, and water is not particularly limited and, for example, the following methods can be mentioned:

(a) a method including mixing the solubilizing agent of the present invention with water to prepare a solubilizing solution, and mixing the obtained solubilizing solution with a hardly water-soluble substance or a mixture containing a hardly water-soluble substance (e.g., sample containing a hardly water-soluble substance), (b) a method including mixing a hardly water-soluble substance or a mixture containing a hardly water-soluble substance with water and mixing the obtained mixture containing the hardly water-soluble substance and water with the solubilizing agent of the present invention or the aqueous solubilizing solution of the present invention, (c) when a mixture containing a hardly water-soluble substance contains water (e.g., when the mixture containing the hardly water-soluble substance is an aqueous dispersion of the hardly water-soluble substance), a method including mixing the aforementioned mixture with the solubilizing agent of the present invention or the aqueous solubilizing solution of the present invention.

The temperature during stirring the mixture containing a hardly water-soluble substance, the solubilizing agent of the present invention, and water is, for example, 4 to 37° C. The explanations of the solubilizing agent (particularly compound (1)), the solubilizing solution, and a hardly water-soluble substance in a method for dissolving the hardly water-soluble substance in water by using the solubilizing agent or the solubilizing solution of the present invention are as described above.

The content of compound (1) in a mixture containing the solubilizing agent, water, and a hardly water-soluble substance is preferably 0.025 to 5.0% by mass, more preferably 0.05 to 5.0% by mass, with respect to the whole mixture mentioned above. The content of water in a mixture containing the solubilizing agent, water, and a hardly water-soluble substance is preferably 85.00 to 99.974% by mass, more preferably 90.00 to 99.94% by mass, with respect to the whole mixture mentioned above. The content of a hardly water-soluble substance in a mixture containing the solubilizing agent, water, and the hardly water-soluble substance is preferably 0.001 to 10.0% by mass, more preferably 0.01 to 5.0% by mass, with respect to the whole mixture mentioned above.

Successively, use of the solubilizing agent of the present invention is described. Examples of the use include dissolving a hardly water-soluble substance in water or an aqueous solution (e.g., buffer) by using the solubilizing agent of the present invention in order to measure the hardly water-soluble substance. In the aforementioned measurement of a hardly water-soluble substance, the content of compound (1) in a mixture containing a reagent for measurement, a hardly water-soluble substance as the target of measurement, water, and compound (1) is preferably 0.025 to 5.0% by mass, more preferably 0.05 to 5.0% by mass, with respect to the whole mixture mentioned above.

EXAMPLE

The present invention is described in more detail in the following Examples and Comparative Examples. However, the present invention is not limited thereto. In the following Examples, the compounds obtained in the following Synthetic Examples 1 to 3 were used as respective solubilizing agents.

Synthesis of compound (1)

Synthetic Example 1

2-Methacryloyloxyethyl-2-trimethylammonioethyl phosphate (MPC) (14.7635 g, 0.050 mol) and 1-octanethiol (8.0460 g, 0.055 mol) were dissolved in ethanol (81.00 g), diisopropylamine (0.2226 g, 0.0022 mol) was added as a catalyst, and the mixture was reacted at room temperature for 24 hr. After completion of the reaction, the reaction solution was concentrated, the concentrate was added to ethyl acetate, and the precipitated sediment was collected by filtration and dried in a vacuum dryer to give 2-[3-(octylsulfanyl)-2-methylpropionyloxy]ethyl-2-(trimethylammonio) ethyl phosphate (compound of the formula (1) wherein X is a methyl group and n is 7) as a white powder (12 g, yield: 50%).

Synthetic Example 2

In the same manner as in Synthetic Example 1 except that 1-dodecanethiol was used instead of 1-octanethiol and the charging amounts were changed so that the molar ratio of the starting materials was the same as in Synthesis Example 1, 2-[3-(dodecylsulfanyl)-2-methylpropionyloxy]ethyl-2-(trimethylammonio)ethyl phosphate (compound of the formula (1) wherein X is a methyl group and n is 11) was obtained as a white powder (12 g, yield: 50%).

Synthetic Example 3

In the same manner as in Synthetic Example 1 except that 1-hexadecanethiol was used instead of 1-octanethiol and the charging amounts were changed so that the molar ratio of the starting materials was the same as in Synthesis Example 1, 2-[3-(hexadecylsulfanyl)-2-methylpropionyloxy]ethyl-2-(trimethylammonio)ethyl phosphate (compound of the formula (1) wherein X is a methyl group and n is 15) was obtained as a white powder (14 g, yield: 50%).

Preparation of Solubilizing Solution

Preparation Example 1-1-1

A solubilizing solution was prepared by dissolving the compound obtained in Synthetic Example 1 in phosphate buffered saline (hereinafter indicated as "PBS") at a concentration of 5.000% by mass.

Preparation Example 1-1-2

A solubilizing solution was prepared by dissolving the compound obtained in Synthetic Example 1 in PBS at a concentration of 0.500% by mass.

Preparation Example 1-1-3

A solubilizing solution was prepared by dissolving the compound obtained in Synthetic Example 1 in PBS at a concentration of 0.050% by mass.

Preparation Example 1-1-4

A solubilizing solution was prepared by dissolving the compound obtained in Synthetic Example 1 in PBS at a concentration of 0.025% by mass.

Preparation Example 1-1-5

A solubilizing solution was prepared by dissolving the compound obtained in Synthetic Example 1 in PBS at a concentration of 0.010% by mass.

Preparation Example 1-2-1

A solubilizing solution was prepared by dissolving the compound obtained in Synthetic Example 2 in PBS at a concentration of 5.000% by mass.

Preparation Example 1-2-2

A solubilizing solution was prepared by dissolving the compound obtained in Synthetic Example 2 in PBS at a concentration of 0.500% by mass.

Preparation Example 1-2-3

A solubilizing solution was prepared by dissolving the compound obtained in Synthetic Example 2 in PBS at a concentration of 0.050% by mass.

Preparation Example 1-2-4

A solubilizing solution was prepared by dissolving the compound obtained in Synthetic Example 2 in PBS at a concentration of 0.025% by mass.

Preparation Example 1-2-5

A solubilizing solution was prepared by dissolving the compound obtained in Synthetic Example 2 in PBS at a concentration of 0.010% by mass.

Preparation Example 1-3-1

A solubilizing solution was prepared by dissolving the compound obtained in Synthetic Example 3 in PBS at a concentration of 5.000% by mass.

Preparation Example 1-3-2

A solubilizing solution was prepared by dissolving the compound obtained in Synthetic Example 3 in PBS at a concentration of 0.500% by mass.

Preparation Example 1-3-3

A solubilizing solution was prepared by dissolving the compound obtained in Synthetic Example 3 in PBS at a concentration of 0.050% by mass.

Preparation Example 1-3-4

A solubilizing solution was prepared by dissolving the compound obtained in Synthetic Example 3 in PBS at a concentration of 0.025% by mass.

Preparation Example 1-3-5

A solubilizing solution was prepared by dissolving the compound obtained in Synthetic Example 3 in PBS at a concentration of 0.010% by mass.

Preparation Example 1-4-1

A solubilizing solution was prepared by dissolving Tween (registered trade mark) 20 manufactured by Bio-Rad Laboratories, Inc. in PBS at a concentration of 0.500% by mass.

Preparation Example 1-4-2

A solubilizing solution was prepared by dissolving Tween (registered trade mark) 20 in PBS at a concentration of 0.500% by mass.

Preparation Example 1-4-3

A solubilizing solution was prepared by dissolving Tween (registered trade mark) 20 in PBS at a concentration of 0.050% by mass.

Preparation Example 1-4-4

A solubilizing solution was prepared by dissolving Tween (registered trade mark) 20 in PBS at a concentration of 0.025% by mass.

Preparation Example 1-4-5

A solubilizing solution was prepared by dissolving Tween (registered trade mark) 20 in PBS at a concentration of 0.010% by mass.

Preparation Example 1-5-1

A solubilizing solution was prepared by dissolving Triton (registered trade mark) X-100 manufactured by NACALAI TESQUE, INC. in PBS at a concentration of 5.000% by mass.

Preparation Example 1-5-2

A solubilizing solution was prepared by dissolving Triton (registered trade mark) X-100 in PBS at a concentration of 0.500% by mass.

Preparation Example 1-5-3

A solubilizing solution was prepared by dissolving Triton (registered trade mark) X-100 in PBS at a concentration of 0.050% by mass.

Preparation Example 1-5-4

A solubilizing solution was prepared by dissolving Triton (registered trade mark) X-100 in PBS at a concentration of 0.025% by mass.

Preparation Example 1-5-5

A solubilizing solution was prepared by dissolving Triton (registered trade mark) X-100 in PBS at a concentration of 0.010% by mass.

Preparation Example 1-6-1

A solubilizing solution was prepared by dissolving Triton (registered trade mark) X-405 manufactured by NACALAI TESQUE, INC. in PBS at a concentration of 5.000% by mass.

Preparation Example 1-6-2

A solubilizing solution was prepared by dissolving Triton (registered trade mark) X-405 in PBS at a concentration of 0.500% by mass.

Preparation Example 1-6-3

A solubilizing solution was prepared by dissolving Triton (registered trade mark) X-405 in PBS at a concentration of 0.050% by mass.

Preparation Example 1-6-4

A solubilizing solution was prepared by dissolving Triton (registered trade mark) X-405 in PBS at a concentration of 0.025% by mass.

Preparation Example 1-6-5

A solubilizing solution was prepared by dissolving Triton (registered trade mark) X-405 in PBS at a concentration of 0.010% by mass.

Solubilization Test of Cholecalciferol (Vitamin $D_3$)

Example 1-1-1 and Example 1-1-2

Cholecalciferol (vitamin $D_3$) was dissolved in ethanol at a concentration of 20 mg/mL to prepare a cholecalciferol solution. The solubilizing solution obtained in Preparation Example 1-1-3 or Preparation Example 1-1-4 was dispensed a 96 well plate at 100 μL/well. The cholecalciferol solution was dispensed at 1 uL/well. The mixture in each well was stirred for 1 min, and the absorbance of the mixture at a wavelength of 450 nm was measured. In addition, the absorbance of PBS alone not containing cholecalciferol at a wavelength of 450 nm was measured. The difference between the absorbance of the mixture of the solubilizing solution and the cholecalciferol solution at a wavelength of 450 nm and the absorbance of PBS alone at a wavelength of 450 nm was taken as "turbidity of a mixture of a solubilizing solution and a cholecalciferol solution". A smaller turbidity indicates a larger amount of a hardly water-soluble substance dissolved therein.

In the same manner as in the above except that PBS was used instead of the solubilizing solution, "turbidity of a mixture of PBS and a cholecalciferol solution" (that is, difference between the absorbance of a mixture of PBS and a cholecalciferol solution at a wavelength of 450 nm and the absorbance of PBS alone at a wavelength of 450 nm) was calculated.

Cholecalciferol is insoluble in PBS. As an index for evaluation of whether or not cholecalciferol is dissolved, turbidity ratio to PBS was calculated by the following formula:

turbidity ratio to PBS (%)=100×(turbidity of a mixture of solubilizing solution and cholecalciferol solution)/(turbidity of a mixture of PBS and cholecalciferol solution). When the turbidity ratio to PBS was less than 10%, cholecalciferol was evaluated to have been dissolved.

Example 1-2-1 and Example 1-2-2

In the same manner as in Example 1-1-1 and Example 1-1-2 except that the solubilizing solution obtained in Preparation Example 1-2-3 or Preparation Example 1-2-4 was used instead of the solubilizing solution obtained in Preparation Example 1-1-3 or Preparation Example 1-1-4, a solubilization test was performed.

Example 1-3-1 and Example 1-3-2

In the same manner as in Example 1-1-1 and Example 1-1-2 except that the solubilizing solution obtained in Preparation Example 1-3-3 or Preparation Example 1-3-4 was used instead of the solubilizing solution obtained in Preparation Example 1-1-3 or Preparation Example 1-1-4, a solubilization test was performed.

Comparative Example 1-1-1

In the same manner as in Example 1-1-1 and Example 1-1-2 except that the solubilizing solution obtained in Preparation Example 1-4-3 was used instead of the solubilizing solution obtained in Preparation Example 1-1-3 or Preparation Example 1-1-4, a solubilization test was performed.

Comparative Example 1-2-1

In the same manner as in Example 1-1-1 and Example 1-1-2 except that the solubilizing solution obtained in Preparation Example 1-5-3 was used instead of the solubilizing solution obtained in Preparation Example 1-1-3 or Preparation Example 1-1-4, a solubilization test was performed.

Comparative Example 1-3-1

In the same manner as in Example 1-1-1 and Example 1-1-2 except that the solubilizing solution obtained in Preparation Example 1-6-3 was used instead of the solubilizing solution obtained in Preparation Example 1-1-3 or Preparation Example 1-1-4, a solubilization test was performed.

Table 1 shows the solubilizing solutions used, the solubilizing agents used, the concentrations of the solubilizing agents in the solubilizing solutions (indicated as "solubilizing agent concentration" in Table 1), turbidity of a mixture of a solubilizing solution and a cholecalciferol solution (indicated as "turbidity" in Table 1), turbidity of a mixture of PBS and a cholecalciferol solution (indicated as "PBS turbidity" in Table 1), and turbidity ratio to PBS. In Table 1, "-m" indicates the end of each Example and each Comparative Example. For example, "Example 1-1" with "−1" is "Example 1-1-1". The column of the solubilizing solution denotes Preparation Example in which the solubilizing solution was prepared. The column of the solubilizing agent denotes Synthetic Example in which the solubilizing agent was synthesized or the trade name of the surfactant.

TABLE 1

| Example Comparative Example | −m | solubilizing solution | solubilizing agent | solubilizing agent concentration (% by mass) | turbidity | turbidity ratio to PBS (%) |
|---|---|---|---|---|---|---|
| Example 1-1 | −1 | Preparation Example 1-1-3 | Synthetic Example 1 | 0.050 | 0.0132 | 5 |
| | −2 | Preparation Example 1-1-4 | | 0.025 | 0.0229 | 9 |
| Example 1-2 | −1 | Preparation Example 1-2-3 | Synthetic Example 2 | 0.050 | 0.0009 | 0 |
| | −2 | Preparation Example 1-2-4 | | 0.025 | 0.0080 | 3 |
| Example 1-3 | −1 | Preparation Example 1-3-3 | Synthetic Example 3 | 0.050 | 0.0139 | 6 |
| | −2 | Preparation Example 1-3-4 | | 0.025 | 0.0231 | 9 |
| Comparative Example 1-1 | −1 | Preparation Example 1-4-3 | Tween 20 | 0.050 | 0.0379 | 15 |
| Comparative Example 1-2 | −1 | Preparation Example 1-5-3 | Triton X-100 | 0.050 | 0.0331 | 13 |
| Comparative Example 1-3 | −1 | Preparation Example 1-6-3 | Triton X-405 | 0.050 | 0.0910 | 37 |

PBS turbidity = 0.2463

As shown in Table 1, the turbidity ratio to PBS was less than 10% in Example 1-1-1 to Example 1-3-2, from which it is found that a hardly water-soluble substance, cholecalciferol, was dissolved. On the other hand, the turbidity ratio to PBS was not less than 10% in Comparative Example 1-1 to Comparative Example 1-3. From these results, it is found that the solubilizing agents and the solubilizing solutions used in Example 1-1-1 to Example 1-3-2 were superior in the property of solubilizing the hardly water-soluble substance, cholecalciferol, as compared with those used in Comparative Example 1-1 to Comparative Example 1-3.

Solubilization Test of DL-α-Tocopherol (Vitamin E)

Example 2-1-1 and Example 2-1-2

DL-α-tocopherol (vitamin E) was dissolved in ethanol at a concentration of 20 mg/mL to prepare a DL-α-tocopherol solution. In the same manner as in Example 1-1-1 and Example 1-1-2 except that this solution was used instead of the cholecalciferol solution, a solubilization test was performed, and "turbidity of a mixture of a solubilizing solution and a DL-α-tocopherol solution" (that is, difference between the absorbance of a mixture of a solubilizing solution and a DL-α-tocopherol solution at a wavelength of 450 nm and the absorbance of PBS alone at a wavelength of 450 nm) was calculated.

In the same manner as above except that PBS was used instead of the solubilizing solution, "turbidity of a mixture of PBS and a DL-α-tocopherol solution" (that is, difference between the absorbance of a mixture of PBS and a DL-α-tocopherol solution at a wavelength of 450 nm and the absorbance of PBS alone at a wavelength of 450 nm) was calculated.

DL-α-tocopherol is insoluble in PBS. As an index for evaluation of whether or not DL-α-tocopherol is dissolved, turbidity ratio to PBS was calculated by the following formula: turbidity ratio to PBS (%)=100×(turbidity of a mixture of solubilizing solution and DL-α-tocopherol solution)/(turbidity of a mixture of PBS and DL-x-tocopherol solution). When the turbidity ratio to PBS was less than 10%, DL-α-tocopherol was evaluated to have been dissolved.

Example 2-2-1

In the same manner as in Example 2-1-1 and Example 2-1-2 except that the solubilizing solution obtained in Preparation Example 1-2-3 was used instead of the solubilizing solution obtained in Preparation Example 1-1-3 or Preparation Example 1-1-4, a solubilization test was performed.

Comparative Example 2-2-1

In the same manner as in Example 2-1-1 and Example 2-1-2 except that the solubilizing solution obtained in Preparation Example 1-5-3 was used instead of the solubilizing solution obtained in Preparation Example 1-1-3 or Preparation Example 1-1-4, a solubilization test was performed.

Table 2 shows the solubilizing solutions used, the solubilizing agents used, the concentrations of the solubilizing agents in the solubilizing solutions (indicated as "solubilizing agent concentration" in Table 2), turbidity of a mixture of a solubilizing solution and a DL-α-tocopherol solution (indicated as "turbidity" in Table 2), turbidity of a mixture of PBS and a DL-α-tocopherol solution (indicated as "PBS turbidity" in Table 1), and turbidity ratio to PBS. In Table 2, "-m" indicates the end of each Example and each Comparative Example. The column of the solubilizing solution denotes Preparation Example in which the solubilizing solution was prepared. The column of the solubilizing agent denotes Synthetic Example in which the solubilizing agent was synthesized or the trade name of the surfactant.

TABLE 2

| Example Comparative Example | -m | solubilizing solution | solubilizing agent | solubilizing agent concentration (% by mass) | turbidity | turbidity ratio to PBS (%) |
|---|---|---|---|---|---|---|
| Example 2-1 | -1 | Preparation Example 1-1-3 | Synthetic Example 1 | 0.050 | 0.0000 | 0 |
| | -2 | Preparation Example 1-1-4 | | 0.025 | 0.0150 | 9 |
| Example 2-2 | -1 | Preparation Example 1-2-3 | Synthetic Example 2 | 0.050 | 0.0153 | 9 |
| Comparative Example 2-2 | -1 | Preparation Example 1-5-3 | Triton X-100 | 0.050 | 0.2573 | 147 |

PBS turbidity = 0.1749

As shown in Table 2, the turbidity ratio to PBS was less than 10% in Example 2-1-1 to Example 2-2-1, from which it is found that a hardly water-soluble substance, DL-α-tocopherol, was dissolved. On the other hand, the turbidity ratio to PBS was not less than 10% in Comparative Example 2-2-1. From these results, it is found that the solubilizing agents and the solubilizing solutions used in Example 2-1-1 to Example 2-2-1 were superior in the property of solubilizing the hardly water-soluble substance, DL-α-tocopherol, as compared with those used in Comparative Example 2-2-1.

Solubilization Test of Hydrocortisone

Example 3-3

Hydrocortisone was dissolved in ethanol at a concentration of 20 mg/mL to prepare a hydrocortisone solution. In the same manner as in Example 1-1-1 and Example 1-1-2 except that this solution was used instead of the cholecalciferol solution, a hydrocortisone solution was dispensed at 125 μL/well, and the solubilizing solution obtained in Preparation Example 1-3-3 was used instead of the solubilizing solution obtained in Preparation Example 1-1-3 or Preparation Example 1-1-4, a solubilization test was performed, and "turbidity of a mixture of a solubilizing solution and a hydrocortisone solution" (that is, difference between the absorbance of a mixture of a solubilizing solution and a hydrocortisone solution at a wavelength of 450 nm and the absorbance of PBS alone at a wavelength of 450 nm) was calculated.

In the same manner as above except that PBS was used instead of the solubilizing solution, "turbidity of a mixture of PBS and a hydrocortisone solution" (that is, difference between the absorbance of a mixture of PBS and a hydrocortisone solution at a wavelength of 450 nm and the absorbance of PBS alone at a wavelength of 450 nm) was measured.

Hydrocortisone is insoluble in PBS. As an index for evaluation of whether or not hydrocortisone is dissolved, turbidity ratio to PBS was calculated by the following formula:

turbidity ratio to PBS (%)=100×(turbidity of a mixture of solubilizing solution and hydrocortisone solution)/(turbidity of a mixture of PBS and hydrocortisone solution). When the turbidity ratio to PBS was less than 10%, hydrocortisone was evaluated to have been dissolved.

Comparative Example 3-1

In the same manner as in Example 3-3 except that the solubilizing solution obtained in Preparation Example 1-4-3 was used instead of the solubilizing solution obtained in Preparation Example 1-3-3, a solubilization test was performed.

Comparative Example 3-2

In the same manner as in Example 3-3 except that the solubilizing solution obtained in Preparation Example 1-5-3 was used instead of the solubilizing solution obtained in Preparation Example 1-3-3, a solubilization test was performed.

Comparative Example 3-3

In the same manner as in Example 3-3 except that the solubilizing solution obtained in Preparation Example 1-6-3 was used instead of the solubilizing solution obtained in Preparation Example 1-3-3, a solubilization test was performed.

Table 3 shows the solubilizing solutions used, the solubilizing agents used, the concentrations of the solubilizing agents in the solubilizing solutions (indicated as "solubilizing agent concentration" in Table 3), turbidity of a mixture of a solubilizing solution and a hydrocortisone solution (indicated as "turbidity" in Table 3), turbidity of a mixture of PBS and a hydrocortisone solution (indicated as "PBS turbidity" in Table 3), and turbidity ratio to PBS. The column of the solubilizing solution denotes Preparation Example in which the solubilizing solution was prepared. The column of the solubilizing agent denotes Synthetic Example in which the solubilizing agent was synthesized or the trade name of the surfactant.

TABLE 3

| Example Comparative Example | solubilizing solution | solubilizing agent | solubilizing agent concentration (% by mass) | turbidity | turbidity ratio to PBS (%) |
|---|---|---|---|---|---|
| Example 3-3 | Preparation Example 1-3-3 | Synthetic Example 3 | 0.050 | 0.0015 | 3 |

TABLE 3-continued

| Example Comparative Example | solubilizing solution | solubilizing agent | solubilizing agent concentration (% by mass) | turbidity | turbidity ratio to PBS (%) |
|---|---|---|---|---|---|
| Comparative Example 3-1 | Preparation Example 1-4-3 | Tween 20 | 0.050 | 0.0240 | 54 |
| Comparative Example 3-2 | Preparation Example 1-5-3 | Triton X-100 | 0.050 | 0.0910 | 205 |
| Comparative Example 3-3 | Preparation Example 1-6-3 | Triton X-405 | 0.050 | 0.0910 | 205 |

PBS turbidity = 0.0443

As shown in Table 3, the turbidity ratio to PBS was less than 10% in Example 3-3, from which it is found that a hardly water-soluble substance, hydrocortisone, was dissolved. On the other hand, the turbidity ratio to PBS was not less than 10% in Comparative Example 3-1 to Comparative Example 3-3. From these results, it is found that the solubilizing agent and the solubilizing solution used in Example 3-3 were superior in the property of solubilizing the hardly water-soluble substance, hydrocortisone, as compared with those used in Comparative Example 3-1 to Comparative Example 3-3.

Solubilization Test of Lauric Acid

Example 4-1

Lauric acid was dissolved in ethanol at a concentration of 100 mg/mL to prepare a lauric acid solution. In the same manner as in Example 1-1-1 and Example 1-1-2 except that this solution was used instead of the cholecalciferol solution, a lauric acid solution was dispensed at 3 μL/well, and the solubilizing solution obtained in Preparation Example 1-1-1 was used instead of the solubilizing solution obtained in Preparation Example 1-1-3 or Preparation Example 1-1-4, a solubilization test was performed, and "turbidity of a mixture of a solubilizing solution and a lauric acid solution" (that is, difference between the absorbance of a mixture of a solubilizing solution and a lauric acid solution at a wavelength of 450 nm and the absorbance of PBS alone at a wavelength of 450 nm) was calculated.

In the same manner as above except that PBS was used instead of the solubilizing solution, "turbidity of a mixture of PBS and a lauric acid solution" (that is, difference between the absorbance of a mixture of PBS and a lauric acid solution at a wavelength of 450 nm and the absorbance of PBS alone at a wavelength of 450 nm) was calculated.

Lauric acid is insoluble in PBS. As an index for evaluation of whether or not lauric acid is dissolved, turbidity ratio to PBS was calculated by the following formula:

turbidity ratio to PBS (%)=100×(turbidity of a mixture of solubilizing solution and lauric acid solution)/(turbidity of a mixture of PBS and lauric acid solution). When the turbidity ratio to PBS was less than 10%, lauric acid was evaluated to have been dissolved.

Comparative Example 4-1

In the same manner as in Example 4-1 except that the solubilizing solution obtained in Preparation Example 1-4-1 was used instead of the solubilizing solution obtained in Preparation Example 1-1-1, a solubilization test was performed.

Comparative Example 4-2

In the same manner as in Example 4-1 except that the solubilizing solution obtained in Preparation Example 1-5-1 was used instead of the solubilizing solution obtained in Preparation Example 1-1-1, a solubilization test was performed.

Comparative Example 4-3

In the same manner as in Example 4-1 except that the solubilizing solution obtained in Preparation Example 1-6-1 was used instead of the solubilizing solution obtained in Preparation Example 1-1-1, a solubilization test was performed.

Table 4 shows the solubilizing solutions used, the solubilizing agents used, the concentrations of the solubilizing agents in the solubilizing solutions (indicated as "solubilizing agent concentration" in Table 4), turbidity of a mixture of a solubilizing solution and a lauric acid solution (indicated as "turbidity" in Table 4), turbidity of a mixture of PBS and a lauric acid solution (indicated as "PBS turbidity" in Table 4), and turbidity ratio to PBS. The column of the solubilizing solution denotes Preparation Example in which the solubilizing solution was prepared. The column of the solubilizing agent denotes Synthetic Example in which the solubilizing agent was synthesized or the trade name of the surfactant.

TABLE 4

| Example Comparative Example | solubilizing solution | solubilizing agent | solubilizing agent concentration (% by mass) | turbidity | turbidity ratio to PBS (%) |
|---|---|---|---|---|---|
| Example 4-1 | Preparation Example 1-1-1 | Synthetic Example 1 | 5.000 | 0.0000 | 0 |
| Comparative Example 4-1 | Preparation Example 1-4-1 | Tween 20 | 5.000 | 0.0039 | 3 |
| Comparative Example 4-2 | Preparation Example 1-5-1 | Triton X-100 | 5.000 | 0.0002 | 0 |

TABLE 4-continued

| Example Comparative Example | solubilizing solution | solubilizing agent | solubilizing agent concentration (% by mass) | turbidity | turbidity ratio to PBS (%) |
|---|---|---|---|---|---|
| Comparative Example 4-3 | Preparation Example 1-6-1 | Triton X-405 | 5.000 | 0.1087 | 92 |

PBS turbidity = 0.1176

As shown in Table 4, the turbidity ratio to PBS was less than 10% in Example 4-1, from which it is found that a hardly water-soluble substance, lauric acid, was dissolved. On the other hand, the turbidity ratio to PBS was not less than 10% in Comparative Example 4-3. From these results, it is found that the solubilizing agent and the solubilizing solution used in Example 4-1 were superior in the property of solubilizing the hardly water-soluble substance, lauric acid, as compared with those used in Comparative Example 4-3. Furthermore, the turbidity to PBS of Example 4-1 was equal to or lower than that of Comparative Example 4-1 and Comparative Example 4-2. From these results, it was found that the ability of the solubilizing agent and the solubilizing solution used in Example 4-1 to solubilize lauric acid was equal to or higher than that of the solubilizing agent (i.e., commercially available Tween (registered trade mark) 20 or Triton (registered trade mark) X-100) and the solubilizing solution, used in Comparative Example 4-1 or Comparative Example 4-2.

Solubilization Test of Myristic Acid

Example 5-1

Myristic acid was dissolved in ethanol at a concentration of 100 mg/mL to prepare a myristic acid solution. In the same manner as in Example 1-1-1 and Example 1-1-2 except that this solution was used instead of the cholecalciferol solution, a myristic acid solution was dispensed at 3 μL/well, and the solubilizing solution obtained in Preparation Example 1-1-1 was used instead of the solubilizing solution obtained in Preparation Example 1-1-3 or Preparation Example 1-1-4, a solubilization test was performed, and "turbidity of a mixture of a solubilizing solution and a myristic acid solution" (that is, difference between the absorbance of a mixture of a solubilizing solution and a myristic acid solution at a wavelength of 450 nm and the absorbance of PBS alone at a wavelength of 450 nm) was calculated.

In the same manner as above except that PBS was used instead of the solubilizing solution, "turbidity of a mixture of PBS and a myristic acid solution" (that is, difference between the absorbance of a mixture of PBS and a myristic acid solution at a wavelength of 450 nm and the absorbance of PBS alone at a wavelength of 450 nm) was calculated.

Myristic acid is insoluble in PBS. As an index for evaluation of whether or not myristic acid is dissolved, turbidity ratio to PBS was calculated by the following formula:

turbidity ratio to PBS (%)=100×(turbidity of a mixture of solubilizing solution and myristic acid solution)/(turbidity of a mixture of PBS and myristic acid solution). When the turbidity ratio to PBS was less than 10%, myristic acid was evaluated to have been dissolved.

Comparative Example 5-1

In the same manner as in Example 5-1 except that the solubilizing solution obtained in Preparation Example 1-4-1 was used instead of the solubilizing solution obtained in Preparation Example 1-1-1, a solubilization test was performed.

Comparative Example 5-2

In the same manner as in Example 5-1 except that the solubilizing solution obtained in Preparation Example 1-5-1 was used instead of the solubilizing solution obtained in Preparation Example 1-1-1, a solubilization test was performed.

Comparative Example 5-3

In the same manner as in Example 5-1 except that the solubilizing solution obtained in Preparation Example 1-6-1 was used instead of the solubilizing solution obtained in Preparation Example 1-1-1, a solubilization test was performed.

Table 5 shows the solubilizing solutions used, the solubilizing agents used, the concentrations of the solubilizing agents in the solubilizing solutions (indicated as "solubilizing agent concentration" in Table 5), turbidity of a mixture of a solubilizing solution and a myristic acid solution (indicated as "turbidity" in Table 5), turbidity of a mixture of PBS and a myristic acid solution (indicated as "PBS turbidity" in Table 5), and turbidity ratio to PBS. The column of the solubilizing solution denotes Preparation Example in which the solubilizing solution was prepared. The column of the solubilizing agent denotes Synthetic Example in which the solubilizing agent was synthesized or the trade name of the surfactant.

TABLE 5

| Example Comparative Example | solubilizing solution | solubilizing agent | solubilizing agent concentration (% by mass) | turbidity | turbidity ratio to PBS (%) |
|---|---|---|---|---|---|
| Example 5-1 | Preparation Example 1-1-1 | Synthetic Example 1 | 5.000 | 0.0231 | 5 |
| Comparative Example 5-1 | Preparation Example 1-4-1 | Tween 20 | 5.000 | 0.0882 | 20 |
| Comparative Example 5-2 | Preparation Example 1-5-1 | Triton X-100 | 5.000 | 0.0601 | 14 |

TABLE 5-continued

| Example Comparative Example | solubilizing solution | solubilizing agent | solubilizing agent concentration (% by mass) | turbidity | turbidity ratio to PBS (%) |
|---|---|---|---|---|---|
| Comparative Example 5-3 | Preparation Example 1-6-1 | Triton X-405 | 5.000 | 0.2602 | 59 |

PBS turbidity = 0.4412

As shown in Table 5, the turbidity to PBS was less than 10% in Example 5-1, from which it is found that a hardly water-soluble substance, myristic acid, was dissolved. On the other hand, the turbidity ratio to PBS was not less than 10% in Comparative Example 5-1 to Comparative Example 5-3. From these results, it is found that the solubilizing agent and the solubilizing solution used in Example 5-1 were superior in the property of solubilizing the hardly water-soluble substance, myristic acid, as compared with those used in Comparative Example 5-1 to Comparative Example 5-3.

The above results have revealed that hardly water-soluble substances can be solubilized using the solubilizing agent of the present invention.

INDUSTRIAL APPLICABILITY

The solubilizing agent of the present invention can be utilized for, for example, the measurement of hardly water-soluble substances.

This application is based on a patent application No. 2020-074983 filed in Japan, the contents of which are incorporated in full herein.

The invention claimed is:

1. A composition comprising water, a hardly water-soluble substance, and a compound represented by the formula (1):

(1)

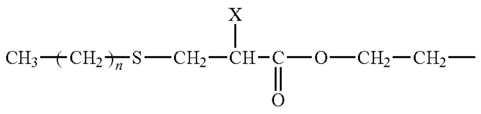

-continued

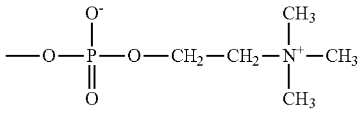

wherein X is a hydrogen atom or a methyl group, and n is an integer of 5 to 15, and the hardly water-soluble substance is at least one selected from the group consisting of a liposoluble vitamin, a steroid, and a fatty acid.

2. The composition of claim 1, wherein X is a hydrogen atom.

3. The composition of claim 2, wherein the hardly water-soluble substance is a liposoluble vitamin.

4. The composition of claim 2, wherein the hardly water-soluble substance is a steroid.

5. The composition of claim 2, wherein the hardly water-soluble substance is a fatty acid.

6. The composition of claim 1, wherein X is a methyl group.

7. The composition of claim 6, wherein the hardly water-soluble substance is a liposoluble vitamin.

8. The composition of claim 6, wherein the hardly water-soluble substance is a steroid.

9. The composition of claim 6, wherein the hardly water-soluble substance is a fatty acid.

* * * * *